US012083795B2

(12) United States Patent
Yatsunami et al.

(10) Patent No.: US 12,083,795 B2
(45) Date of Patent: Sep. 10, 2024

(54) LIQUID EJECTING APPARATUS

(71) Applicant: SEIKO EPSON CORPORATION, Tokyo (JP)

(72) Inventors: Tetsuji Yatsunami, Okaya (JP); Yuji Misawa, Matsumoto (JP); Toshihiro Imae, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/498,600

(22) Filed: Oct. 11, 2021

(65) Prior Publication Data

US 2022/0111642 A1 Apr. 14, 2022

(30) Foreign Application Priority Data

Oct. 12, 2020 (JP) ................................ 2020-171767

(51) Int. Cl.
*B41J 2/045* (2006.01)
*B41J 2/14* (2006.01)
*B41J 2/175* (2006.01)

(52) U.S. Cl.
CPC ....... *B41J 2/04588* (2013.01); *B41J 2/14201* (2013.01); *B41J 2/17596* (2013.01)

(58) Field of Classification Search
None
See application file for complete search history.

(56) References Cited

U.S. PATENT DOCUMENTS

| | | | | |
|---|---|---|---|---|
| 4,736,887 A * | 4/1988 | Inaba | A47G 21/189 | 239/33 |
| 4,850,533 A * | 7/1989 | Hoshi | A47G 21/189 | 285/302 |
| 5,195,787 A * | 3/1993 | Bartholomew | F16L 37/0987 | 285/317 |
| RE48,686 E * | 8/2021 | Otsuka | B41J 2/1714 | |
| 2013/0229458 A1* | 9/2013 | Masuda | B41J 11/00214 | 347/30 |
| 2017/0157727 A1* | 6/2017 | Felton | B23Q 11/0046 | |
| 2017/0232767 A1 | 8/2017 | Togashi | | |
| 2018/0201013 A1 | 7/2018 | Okina et al. | | |

FOREIGN PATENT DOCUMENTS

| | | |
|---|---|---|
| JP | 2009083385 A | 4/2009 |
| JP | 2017140810 A | 8/2017 |
| JP | 2020026071 A | 2/2020 |

* cited by examiner

*Primary Examiner* — Alejandro Valencia
(74) *Attorney, Agent, or Firm* — Pramod Chintalapoodi

(57) ABSTRACT

A liquid ejecting apparatus includes: a liquid ejecting head that includes a nozzle surface on which a nozzle is open and that ejects a liquid through the nozzle; a housing that accommodates the liquid ejecting head; a moving mechanism that moves the liquid ejecting head relative to the housing in a moving direction intersecting the nozzle surface; and a duct in which a fluid flows, in which the duct includes a first coupling section coupled to the housing and a second coupling section coupled to the liquid ejecting head and is configured to expand and contract in the moving direction.

14 Claims, 7 Drawing Sheets

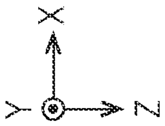
FIG. 7
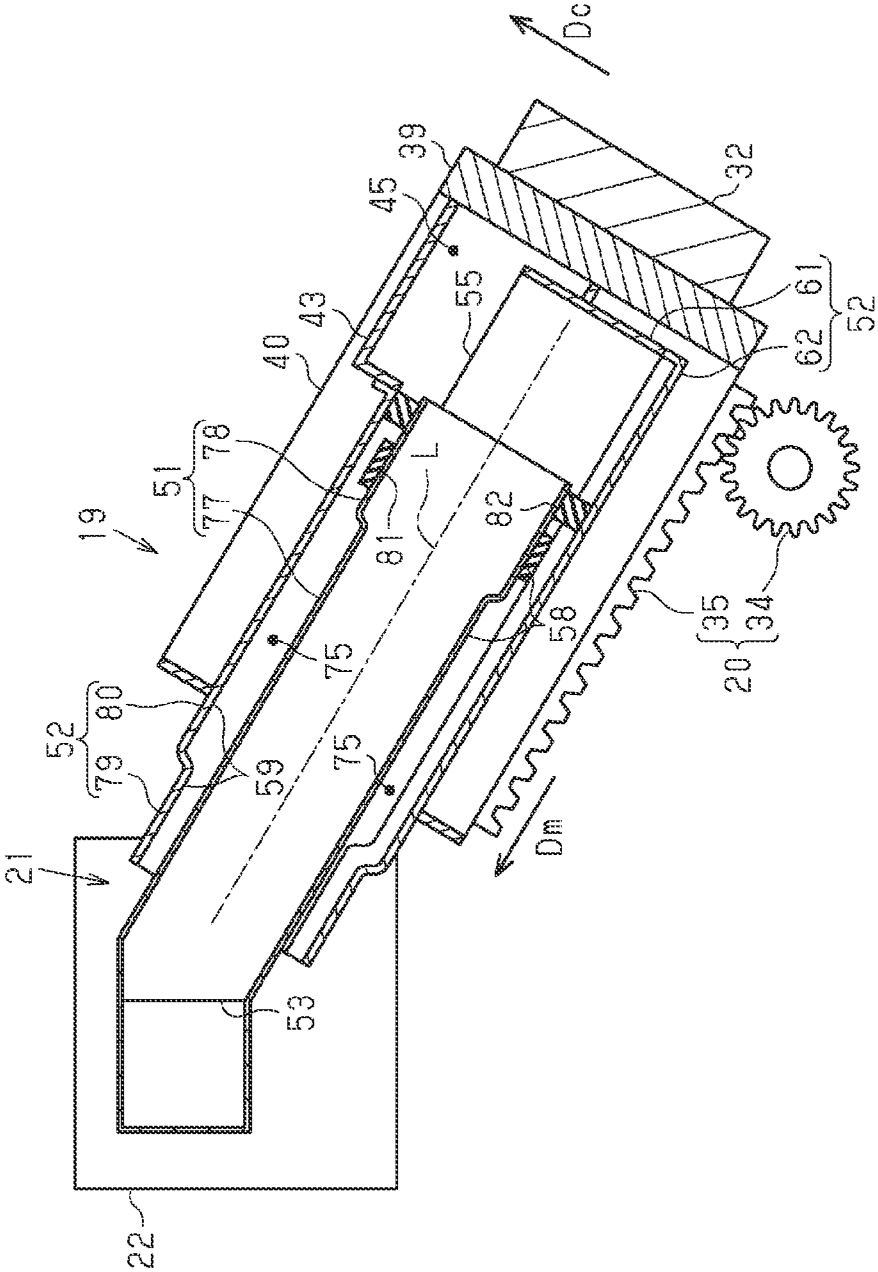

LIQUID EJECTING APPARATUS

The present application is based on, and claims priority from JP Application Serial Number 2020-171767, filed Oct. 12, 2020, the disclosure of which is hereby incorporated by reference herein in its entirety.

BACKGROUND

1. Technical Field

The present disclosure relates to a liquid ejecting apparatus such as a printer.

2. Related Art

For example, as described in JP-A-2017-140810, recording apparatuses, which are examples of a liquid ejecting apparatus, for performing printing by ejecting ink, which is an example of a liquid, from a recording head, which is an example of a liquid ejecting head, are known. A gap between the recording head and a medium is adjusted when the recording head is raised/lowered relative to the surface on which ink lands.

When a drive element causes a change in pressure of the liquid, the liquid ejecting head ejects the liquid from nozzles. The drive element is driven in accordance with a driving waveform signal generated by a signal generating circuit. The signal generating circuit provided in the liquid ejecting head is able to reduce the influence of noise.

When, for example, a member, such as a signal generating circuit, which generates heat is provided in the liquid ejecting head, the liquid ejecting head is required to be cooled. However, it is difficult to cool a moving liquid ejecting head.

SUMMARY

A liquid ejecting apparatus includes: a liquid ejecting head that includes a nozzle surface on which a nozzle is open and that ejects a liquid through the nozzle; a housing that accommodates the liquid ejecting head; a moving mechanism that moves the liquid ejecting head relative to the housing in a moving direction intersecting the nozzle surface; and a duct in which a fluid flows, in which the duct includes a first coupling section coupled to the housing and a second coupling section coupled to the liquid ejecting head and is configured to expand and contract in the moving direction.

BRIEF DESCRIPTION OF THE DRAWINGS

FIG. 7 is a schematic sectional view illustrating the duct in a contracted state.

DESCRIPTION OF EXEMPLARY EMBODIMENTS

First Embodiment

Figure 1:
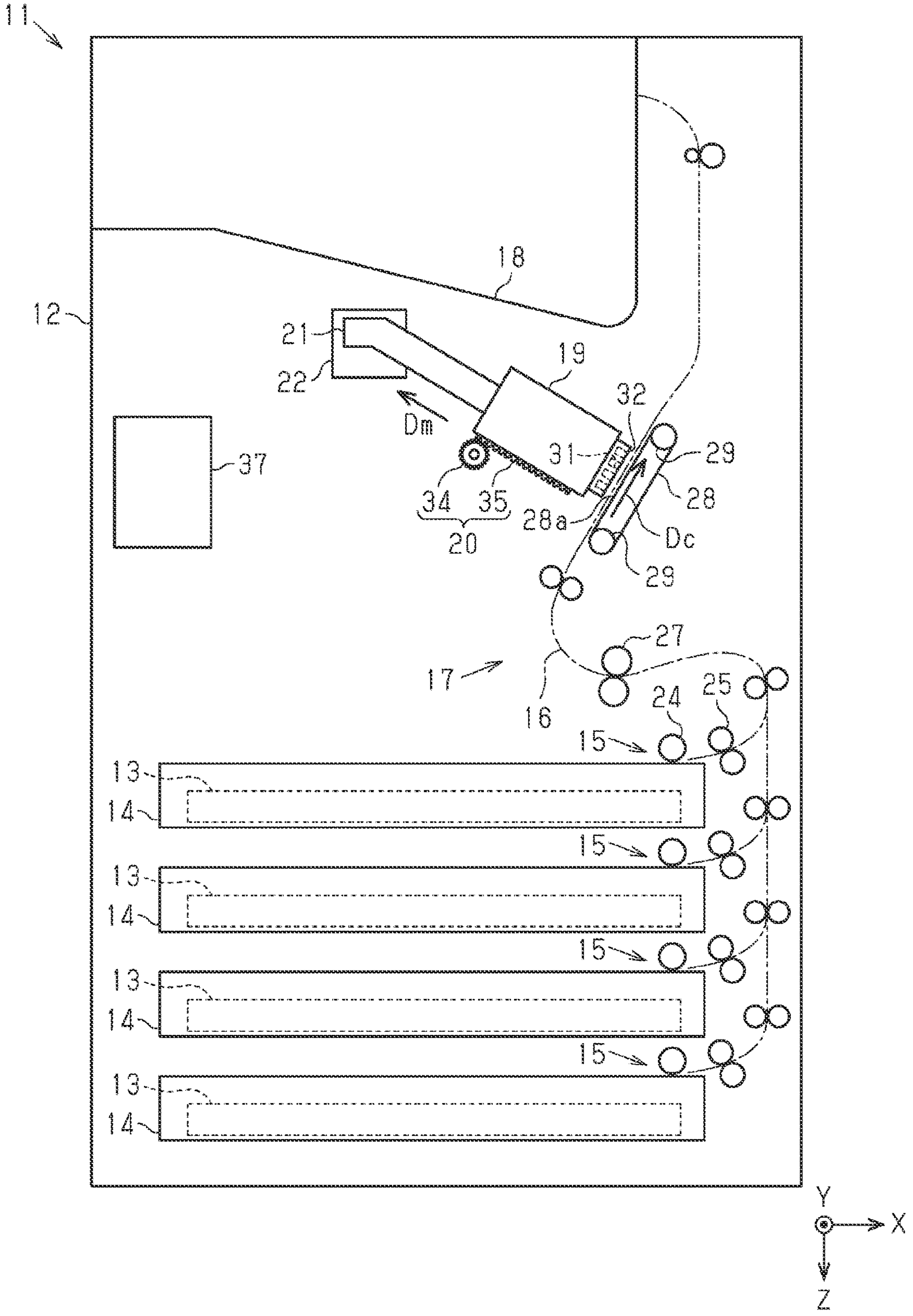
FIG. 1 is a schematic view of a first embodiment of a liquid ejecting apparatus.

A first embodiment of a liquid ejecting apparatus will be described below with reference to the drawings. Examples of the liquid ejecting apparatus of the present embodiment include an ink jet printer that ejects ink, which is an example of a liquid, onto a medium, such as a sheet, to perform printing.

In the drawings, on the assumption that a liquid ejecting apparatus 11 is installed on a horizontal surface, the direction of gravity is indicated by the Z-axis, and directions extending horizontally are indicated by the X-axis and the Y-axis. The X-axis, the Y-axis, and the Z-axis are orthogonal to each other. In the following description, a direction parallel to the Y-axis is also referred to as a depth direction Y.

As illustrated in FIG. 1, the liquid ejecting apparatus 11 may include a housing 12, a medium-accommodating section 14 that is able to accommodate a medium 13, and a feeding section 15 that feeds the medium 13. The liquid ejecting apparatus 11 may include a transporting section 17 that transports the medium 13 along a transporting path 16 indicated by the one-dot chain line in the figure and a stacker 18 that receives the medium 13. The transporting path 16 couples the medium-accommodating section 14 and the stacker 18.

The liquid ejecting apparatus 11 includes a liquid ejecting head 19 which ejects liquid, a moving mechanism 20 which moves the liquid ejecting head 19, and a duct 21 in which a fluid flows. The liquid ejecting apparatus 11 may include a pump 22 that feeds a fluid into the duct 21. The housing 12 accommodates at least the liquid ejecting head 19.

The medium-accommodating section 14 is able to accommodate a plurality of media 13 in a stacked manner. The liquid ejecting apparatus 11 may include a plurality of medium-accommodating sections 14 and feeding sections 15 in the same number as the medium-accommodating sections 14. The feeding section 15 may include a feeding roller 24 that feeds the medium 13 accommodated in the medium-accommodating section 14 and a separating section 25 that separates the media 13 one by one. The feeding section 15 transports the medium 13 accommodated in the medium-accommodating section 14 to the transporting path 16.

The transporting section 17 may include a transporting roller 27, an endless transporting belt 28, and a pair of pulleys 29 around which the transporting belt 28 is wound. The transporting section 17 may include a plurality of transporting rollers 27. The transporting rollers 27 transport the medium 13 by rotating in a state of holding the medium 13 therebetween.

The transporting belt 28 has a transporting surface 28*a* on which the medium 13 is transported. The transporting surface 28*a* is a planar surface of the outer peripheral surface of the transporting belt 28, which supports the medium 13 through, for example, electrostatic adsorption. The transporting belt 28 may be provided such that the transporting surface 28*a* is inclined with respect to the horizontal. In the present embodiment, a direction along which the transporting surface 28*a* extends and in which the medium 13 is transported is a transporting direction Dc. The transporting belt 28 transports the medium 13 in the transporting direction Dc by circulating around the pulleys 29 in a state in which the medium 13 is supported on the transporting surface 28*a*.

The liquid ejecting head 19 has a nozzle surface 32 on which a plurality of nozzles 31 are open. The nozzle surface 32 is constituted by a nozzle plate in which the nozzles 31 are open. The liquid ejecting head 19 ejects liquid through the nozzles 31 and performs printing on the medium 13. The liquid ejecting head 19 may be provided such that the nozzle surface 32 is inclined with respect to the horizontal. The liquid ejecting head 19 of the present embodiment is of a line type that is able to eject liquid in the width direction of the medium 13. The liquid ejecting head 19 is provided such that the longitudinal direction of the liquid ejecting head 19 extends in the depth direction Y.

The moving mechanism 20 may have a driving gear 34 and a rack 35 provided in the liquid ejecting head 19. The liquid ejecting head 19 and the rack 35 move in accordance with rotation of the driving gear 34. The moving mechanism 20 moves the liquid ejecting head 19 relative to the housing 12 in a moving direction Dm intersecting the nozzle surface 32. The moving direction Dm is a direction in which the liquid ejecting head 19 is separated from the transporting belt 28. The moving direction Dm may be perpendicular to the nozzle surface 32. The moving direction Dm of the present embodiment includes a component of a direction perpendicular to the nozzle plate and is perpendicular to the transporting surface 28*a*. The moving direction Dm includes a vertical direction component and a horizontal direction component.

The moving mechanism 20 causes the driving gear 34 to rotate forward and thereby moves the liquid ejecting head 19 in the moving direction Dm. The moving mechanism 20 causes the driving gear 34 to rotate in reverse and thereby moves the liquid ejecting head 19 in a direction opposite to the moving direction Dm. The liquid ejecting head 19 moves between a printing position illustrated in FIG. 1 and a standby position illustrated in FIG. 5. The printing position is a position at which the liquid ejecting head 19 ejects liquid onto the medium 13 to perform printing. The standby position is a position at which the liquid ejecting head 19 stands by at a non-printing time. The liquid ejecting apparatus 11 may include a maintenance section (not illustrated) that performs maintenance of the liquid ejecting head 19 positioned at the standby position.

The liquid ejecting apparatus 11 includes a control section 37 that controls various operations of the liquid ejecting apparatus 11. The control section 37 can be constituted as a circuit including α: one or more processors that execute various types of processing in accordance with a computer program; β: one or more dedicated hardware circuits, such as an application specific integrated circuit, which execute at least some of the various types of processing; or γ: a combination thereof. A processor includes a CPU and memory such as RAM or ROM, and the memory stores program code or commands which cause the CPU to execute processing. The memory, that is, a computer-readable medium, may be any readable medium accessible by using a general-purpose or dedicated computer.

Figure 2:
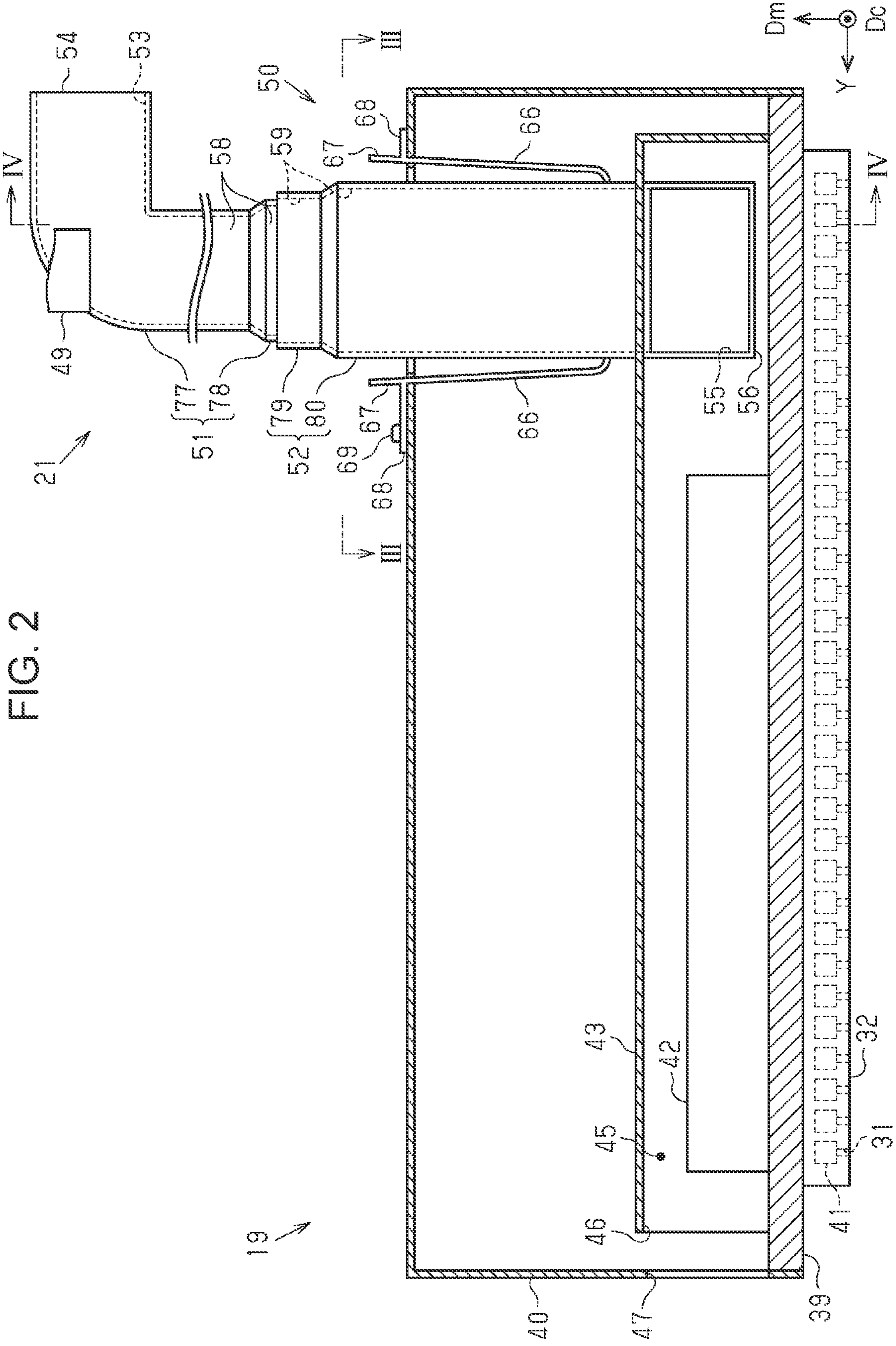
FIG. 2 is a schematic view of a liquid ejecting head.

As illustrated in FIG. 2, the liquid ejecting head 19 may include a base 39 and a frame 40. The liquid ejecting head 19 may have a drive element 41, a signal generating circuit 42, and a cover 43 that covers the signal generating circuit 42. The liquid ejecting head 19 may have a plurality of drive elements 41 that correspond to the plurality of nozzles 31. The drive element 41 is driven such that liquid is ejected from the nozzle 31. The signal generating circuit 42 generates a driving waveform signal Com to be applied to the drive element 41. The drive element 41 has, for example, a piezoelectric element and deforms the piezoelectric element in accordance with the driving waveform signal Com, resulting in ejection of liquid from the nozzles.

The cover 43 may form a channel 45, in which a fluid flows, between the base 39 and the cover 43. The duct 21 is coupled to the channel 45 on the rear side thereof further than the center in the depth direction Y, and the channel 45 communicates with the outside via a first opening 46 positioned on the front side further than the center. The frame 40 may have a second opening 47 aligned with the first opening 46 in the depth direction Y. The presence of the second opening 47 enables the fluid in the channel 45 to readily flow. The signal generating circuit 42 is provided in the channel 45. The signal generating circuit 42 is provided between the duct 21 and the first opening 46 in the depth direction Y.

Duct

The duct 21 has a first coupling section 49 coupled to the housing 12 and a second coupling section 50 coupled to the liquid ejecting head 19. The duct 21 may have a first duct 51 having the first coupling section 49 and a second duct 52 having the second coupling section 50. The duct 21 may have a first end 54 in which an outlet 53 is open and a second end 56 in which an inlet 55 is open. The inlet 55 is coupled to the pump 22. The duct 21 enables the inlet 55 and the outlet 53 to communicate with each other and enables the fluid to flow between the inlet 55 and the outlet 53.

The first duct 51 enables the fluid to flow between the housing 12 and the second duct 52. The first duct 51 of the present embodiment enables the fluid to flow between the pump 22, which is fixed to the housing 12, and the second duct 52. The second duct 52 enables the fluid to flow between the first duct 51 and the liquid ejecting head 19. The second end 56 and the inlet 55 of the second duct 52 are positioned in the channel 45.

The first duct 51 has a first slide surface 58. The first slide surface 58 is the outer surface of the first duct 51. The second duct 52 has a second slide surface 59 that faces the first slide surface 58. The second slide surface 59 is the inner surface of the second duct 52.

Figure 3:
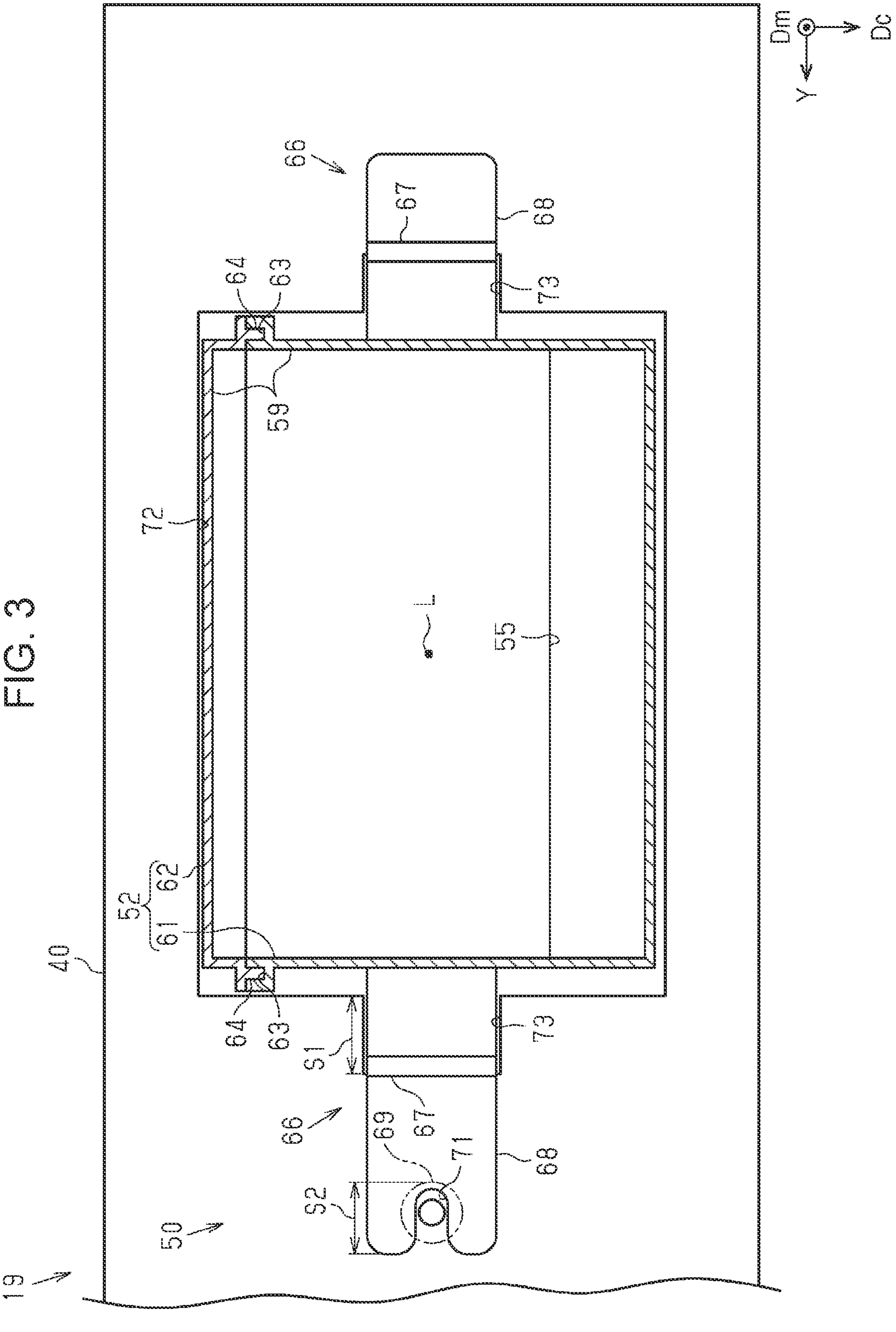
FIG. 3 is a sectional view taken along line III-III in FIG. 2.

As illustrated in FIGS. 2 and 3, each of the first duct 51 and the second duct 52 is a rectangular cylinder having a rectangular section perpendicular to a virtual straight-line L. Each of the first slide surface 58 and the second slide surface 59 is parallel to the virtual straight-line L and provided so as to encompass the virtual straight-line L. The second duct 52 may slide relative to the first duct 51 in accordance with the liquid ejecting head 19 moving relative to the housing 12.

Of the first slide surface 58 and the second slide surface 59, the first slide surface 58 arranged in an inner portion may be constituted by a single member. Of the first slide surface 58 and the second slide surface 59, the second slide surface 59 arranged in an outer portion may be constituted by plural members.

As illustrated in FIG. 3, the second duct 52 may have a main body 61 having a groove shape and a lid 62. The second slide surface 59 may be constituted by the main body 61 and the lid 62. The second duct 52 may have a groove 63 and a protrusion 64 each extending across a region in which the main body 61 and the lid 62 are coupled to each other. The main body 61 of the present embodiment has the groove 63. The lid 62 has the protrusion 64. When the lid 62 is attached to the main body 61, the protrusion 64 fits into the groove 63.

Second Coupling Section

As illustrated in FIGS. 2 and 3, the second coupling section 50 is provided between the first end 54 and the second end 56. The second coupling section 50 may have a plate spring 66 having elasticity. That is, the second coupling section 50 may have elasticity. The second coupling section 50 may have a plurality of plate springs 66. The second coupling section 50 of the present embodiment has two plate springs 66 arranged with the second duct 52 therebetween in the depth direction Y. By using the two plate springs 66 arranged in the depth direction Y, the second coupling section 50 enables positional deviation of the second duct 52 in the depth direction Y with respect to the liquid ejecting head 19.

Since the two plate springs 66 have substantially the same configuration, common constituents will be given the same reference numerals, and redundant description will be thereby omitted.

The plate spring 66 may have a handle 67 provided in the tip end of the plate spring 66 and a protrusion 68 placed over the liquid ejecting head 19. The protrusion 68 is provided closer to the tip end of the plate spring 66 than to the base end of the plate spring 66. The handle 67 is a portion between the protrusion 68 and the tip end. When the protrusion 68 is pushed against the liquid ejecting head 19, the plate spring 66 causes the second duct 52 to be coupled to the liquid ejecting head 19. An operator is able to decouple the second duct 52 and the liquid ejecting head 19 by deforming the plate spring 66 so as to bring the handle 67 close to the second duct 52.

The base end of the plate spring 66 may be fixed to the second duct 52, or the plate spring 66 may be formed to be integrated with the second duct 52. The two plate springs 66 are linearly symmetrical with respect to the virtual straight-line L. The virtual straight-line L passes through the center of the second duct 52 and extends in the moving direction Dm. At least one of the plate springs 66 may be fixed to the frame 40 by using a screw 69. In the present embodiment, a single plate spring 66 is fixed.

As illustrated in FIG. 3, the fixed plate spring 66 may have a cut-out 71 through which the screw 69 passes. The cut-out 71 is recessed from the tip end of the protrusion 68. A direction in which the cut-out 71 extends is identical to a direction in which the plate spring 66 deforms to decouple the second coupling section 50.

The frame 40 may have a through hole 72 through which the duct 21 is inserted and a recess 73 into which the plate spring 66 fits. When a first dimension S1 of the recess 73 in the depth direction Y is greater than a second dimension S2 from the tip end of the protrusion 68 to the edge of the screw 69, it is possible to couple or decouple the second coupling section 50 in a state in which the screw 69 is loosened.

Figure 4:
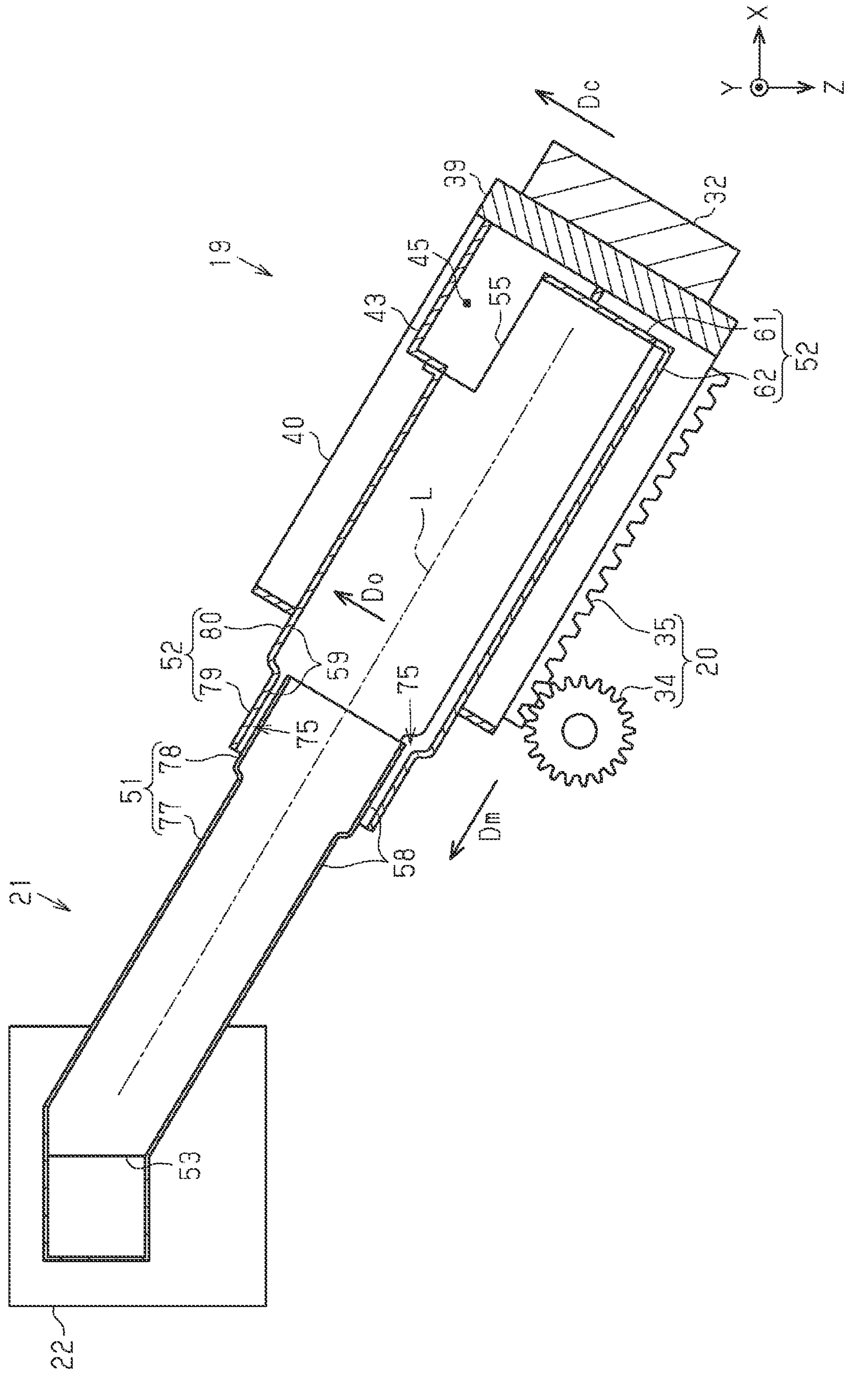
FIG. 4 is a sectional view taken along line IV-IV in FIG. 2.

As illustrated in FIG. 4, the first slide surface 58 and the second slide surface 59 may be provided with a gap 75 therebetween, the gap 75 having a sufficient dimension to enable the fluid to pass therethrough. Specifically, the first slide surface 58 and the second slide surface 59 are provided with the gap 75 therebetween in an orthogonal direction Do orthogonal to the virtual straight-line L. The first duct 51 and the second duct 52 are able to move relative to each other in the orthogonal direction Do.

The first duct 51 may have a first thin tube section 77 and a first thick tube section 78 thicker than the first thin tube section 77. The second duct 52 may have a second thin tube section 79 and a second thick tube section 80 thicker than the second thin tube section 79. The first thick tube section 78 is positioned between the first thin tube section 77 and the liquid ejecting head 19 and is thinner than the second thin tube section 79. The second thick tube section 80 is positioned between the second thin tube section 79 and the liquid ejecting head 19. The inlet 55 is provided in the second thick tube section 80. The first slide surface 58 is constituted by the outer surfaces of the first thin tube section 77 and the first thick tube section 78. The second slide surface 59 is constituted by the inner surfaces of the second thin tube section 79 and the second thick tube section 80.

Operation of the present embodiment will be described.

The duct 21 is able to expand and contract in the moving direction Dm. Specifically, the duct 21 expands/contracts when the amount by which the first duct 51 and the second duct 52 overlap is changed.

As illustrated in FIG. 4, when the liquid ejecting head 19 is at the printing position, the amount by which the first duct 51 and the second duct 52 overlap is minimum, and the length of the duct 21 is maximum. In a state in which the liquid ejecting head 19 is at the printing position and in which the duct 21 is expanded, the first thick tube section 78 and the second thin tube section 79 may face each other. The gap 75 is formed between the first thick tube section 78 and the second thin tube section 79.

When the liquid ejecting head 19 moves in the moving direction Dm, the second duct 52 moves in the moving direction Dm together with the liquid ejecting head 19. The amount by which the first duct 51 and the second duct 52 overlap increases in accordance with the movement of the second duct 52.

Figure 5:
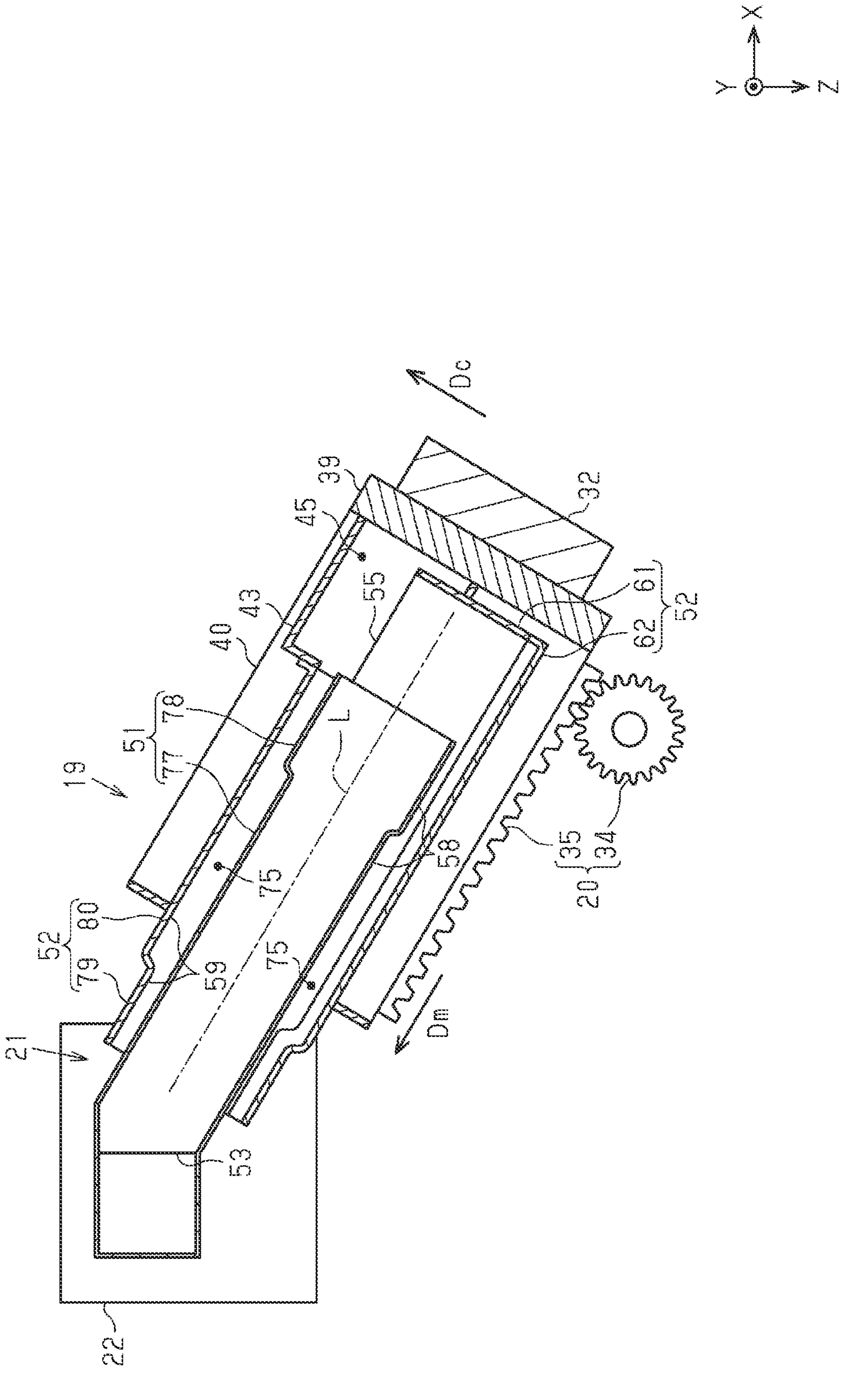
FIG. 5 is a schematic sectional view illustrating a duct in a contracted state.

As illustrated in FIG. 5, when the liquid ejecting head 19 is at the standby position, the amount by which the first duct 51 and the second duct 52 overlap is maximum, and the length of the duct 21 is minimum. In a state in which the duct 21 is contracted, the first thin tube section 77 and the second thin tube section 79 may face each other, and the first thick tube section 78 and the second thick tube section 80 may face each other. The gap 75 is formed between the first slide surface 58 and the second slide surface 59. In the state in which the duct 21 is contracted, a portion of the first thick tube section 78 may be at the same position as the inlet 55 in the moving direction Dm.

The pump 22 may feed the fluid into the duct 21 which may be in the expanded state, the contracted state, or in a state of being deformed. In the present embodiment, when the pump 22 sucks air, which is an example of a fluid, in the duct 21, air which has flowed into the channel 45 from the first opening 46 flows into the duct 21 through the channel 45. That is, not only the duct 21 but also the cover 43 may enable the fluid to flow therein.

Effects of the present embodiment will be described.

The duct 21 coupled to the housing 12 and the liquid ejecting head 19 is able to expand and contract in the moving direction Dm. Accordingly, the duct 21 expands/contracts in response to movement of the liquid ejecting head 19 in the moving direction Dm. It is therefore possible to cool the moving liquid ejecting head 19.

The duct 21 expands/contracts when the second duct 52 slides relative to the first duct 51. It is therefore possible to reduce possible deformation of the duct 21 compared with an instance in which the duct 21 has, for example, a bellows shape.

Each of the first slide surface 58 and the second slide surface 59 is parallel to the virtual straight-line L extending in the moving direction Dm and is provided so as to encompass the virtual straight-line L. It is therefore possible to efficiently cause the fluid to flow compared with an instance in which, for example, the first slide surface 58 and the second slide surface 59 intersect the virtual straight-line L.

The first duct 51 and the second duct 52 are able to move relative to each other in the orthogonal direction Do. Accordingly, the second duct 52 is able to follow the liquid ejecting head 19 even when the position of the liquid ejecting head 19 with respect to the housing 12 deviates in the orthogonal direction Do.

The second duct 52 readily slides in a state in which the second slide surface 59 is not in contact with the first slide surface 58 compared with a state in which the second slide surface 59 is in contact with the first slide surface 58. From this viewpoint, the first slide surface 58 and the second slide surface 59 are provided with the gap 75 therebetween, the gap 75 having a sufficient dimension to enable the fluid to pass therethrough. The second duct 52 is thus able to readily slide relative to the first duct 51.

Of the first slide surface 58 and the second slide surface 59, the first slide surface 58 arranged in an inner portion is constituted by a single member. Accordingly, even when the liquid ejecting apparatus 11 is reduced in size, the first slide surface 58 is readily bent and thus enables positional deviation of the liquid ejecting head 19 with respect to the housing 12.

Of the first slide surface 58 and the second slide surface 59, the second slide surface 59 arranged in an outer portion is constituted by plural members. It is therefore possible to easily increase the liquid ejecting apparatus 11 in size.

In the state in which the duct 21 is expanded, since the first thick tube section 78 and the second thin tube section 79 face each other, it is possible to narrow the gap 75 between the first duct 51 and the second duct 52, enabling a reduction in fluid leakage. In the state in which the duct 21 is contracted, since the second thin tube section 79 faces the first thin tube section 77 which is thinner than the first thick tube section, the gap 75 between the first duct 51 and the second duct 52 is widened, thus making it possible to easily slide the second duct 52 relative to the first duct 51.

The second coupling section 50 has elasticity and thus enables positional deviation of the liquid ejecting head 19.

The second coupling section 50 is provided between the first end 54 and the second end 56 of the duct 21. It is therefore possible to provide the second coupling section 50 close to the first end 54 compared with an instance in which, for example, the second coupling section 50 is provided in the second end 56.

The second coupling section 50 has the handle 67 provided in the tip end of the plate spring 66, and the plate spring 66 pushes the protrusion 68 against the liquid ejecting head 19. The operator is thus able to detach the protrusion 68 from the liquid ejecting head 19 by operating the handle 67 to deform the plate spring 66.

The liquid ejecting head 19 has the cover 43 that covers the signal generating circuit 42. Not only the duct 21 but also the cover 43 enables the fluid to flow therein. It is therefore possible to efficiently cool the signal generating circuit 42 by using the fluid flowing in the cover 43.

The pump 22 feeds the fluid into the duct 21 which may be in the expanded state, the contracted state, or in a state of being deformed. That is, the pump 22 is able to feed the fluid into the duct 21 regardless of the duct 21 state. It is therefore possible to cool the stopped liquid ejecting head 19 or the moving liquid ejecting head 19.

The second duct 52 includes the main body 61 having the groove 63 and the lid 62 having the protrusion 64. When the protrusion 64 is fit into the groove 63, the second duct 52 is able to reduce fluid leakage from a space between the main body 61 and the lid 62.

Second Embodiment

Next, a second embodiment of the liquid ejecting apparatus will be described with reference to the drawings. Note that the second embodiment differs from the first embodiment in that a flexible member is provided. Since the other points are substantially the same as those of the first embodiment, the same constituents will be given the same reference numerals, and redundant description will be thereby omitted.

Figure 6:
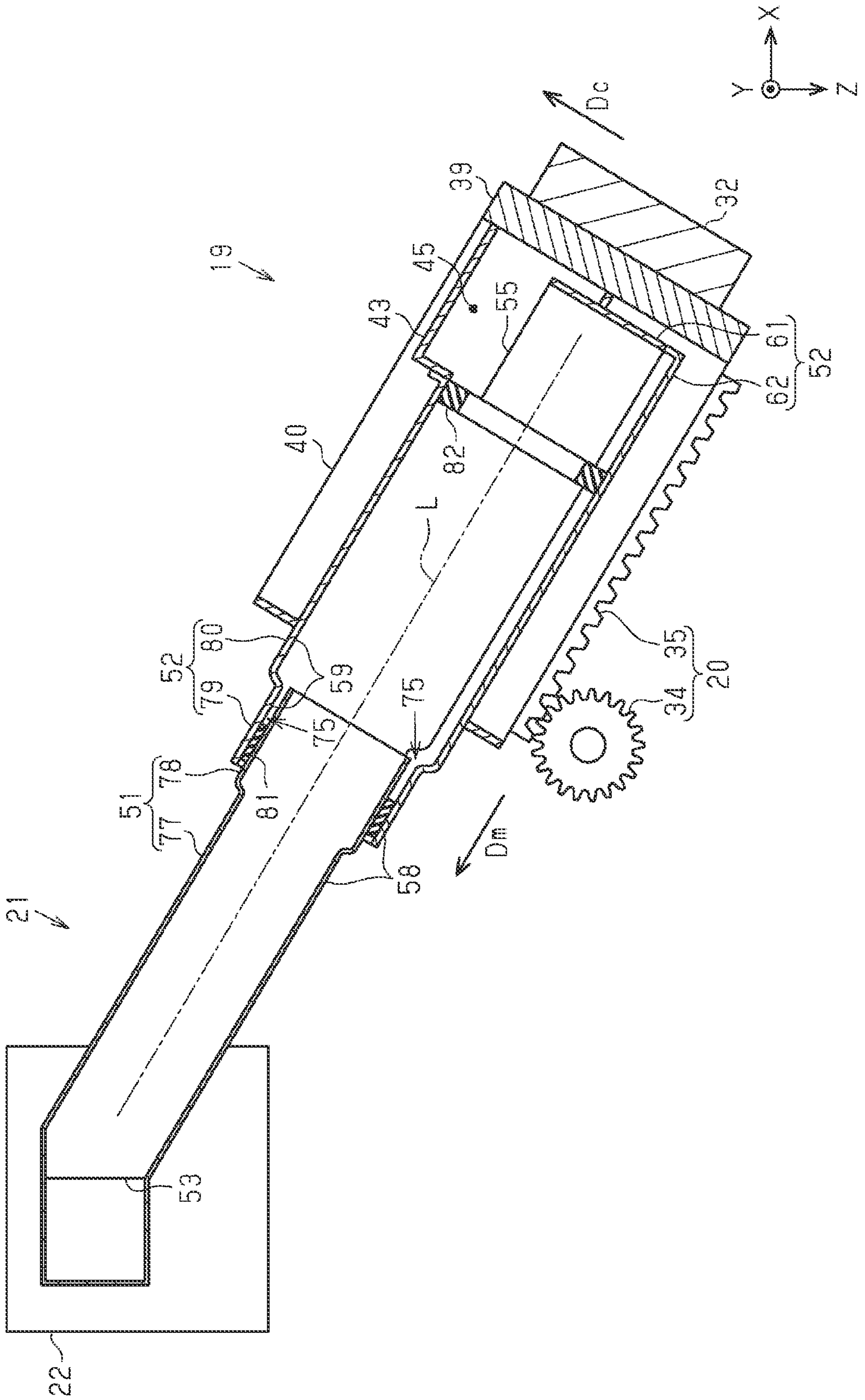
FIG. 6 is a schematic sectional view of a second embodiment of a duct.

As illustrated in FIG. 6, the liquid ejecting apparatus 11 may include a first flexible member 81, which is an example of a flexible member. The liquid ejecting apparatus 11 may include a second flexible member 82, which is an example of a flexible member. The first flexible member 81 and the second flexible member 82 have flexibility.

Each of the first flexible member 81 and the second flexible member 82 is provided in the gap 75 and slides relative to one of the first slide surface 58 and the second slide surface 59. Specifically, the first flexible member 81 is wound around the first slide surface 58, which is the outer surface of the first thick tube section 78, and slides relative to the second slide surface 59. The second flexible member 82 is provided on the second slide surface 59, which is the inner surface of the second thick tube section 80, and slides relative to the first slide surface 58.

Operation of the present embodiment will be described.

As illustrated in FIG. 6, in the state in which the duct 21 is expanded, the first flexible member 81 is positioned in the gap 75 between the first thick tube section 78 and the second thin tube section 79. The first flexible member 81 closes the gap 75 and restricts a flow of the fluid passing through the gap 75.

When the second duct 52 moves in the moving direction Dm and the second thin tube section 79 leaves the first thick tube section 78, the first flexible member 81 also leaves the second slide surface 59. The second duct 52 thus moves in the moving direction Dm in a state in which friction between the first duct 51 and the second duct 52 is reduced.

As illustrated in FIG. 7, in the state in which the duct 21 is contracted, the second flexible member 82 is positioned in the gap 75 between the first thick tube section 78 and the second thick tube section 80. The second flexible member 82 closes the gap 75 and restricts a flow of the fluid passing through the gap 75. When the first duct 51 and the second duct 52 move relative to each other in the orthogonal direction Do orthogonal to the virtual straight-line L, the first flexible member 81 and the second flexible member 82 are bent and deformed and enable the relative movement.

An effect of the present embodiment will be described.

The first flexible member 81 and the second flexible member 82 that are provided in the gap 75 are able to enable movement of the second duct 52 following the liquid ejecting head 19 even when the position of the liquid ejecting head 19 with respect to the housing 12 deviates in the orthogonal direction Do.

The present embodiment is able to be modified and implemented in the following manner. The present embodiment and the following modified examples may be implemented in combination within a range in which they do not technically contradict each other.

The moving mechanism 20 may have a rail (not illustrated) which guides movement of the liquid ejecting head 19. The rail may be linear or curved. The moving direction Dm may extend along the curved rail.

The moving mechanism 20 may move the liquid ejecting head 19 by fixing the liquid ejecting head 19 to an annular belt and causing the belt to circulate. The moving mechanism 20 may move the liquid ejecting head 19 so as to raise the liquid ejecting head 19, for example, by using a winch. The moving mechanism 20 may move the liquid ejecting head 19 so as to push the liquid ejecting head 19 up, for example, by using a jack.

The pump 22 may feed the fluid into the duct 21. In this instance, the inlet 55 into which the fluid flows is provided in the first duct 51, and the outlet 53 from which the fluid flows out is provided in the second duct 52. The fluid may flow from the duct 21 into the channel 45 and be discharged from the first opening 46.

The main body 61 may have the protrusion 64, and the lid 62 may have the groove 63.

The duct 21 may be a circular tube having a circular section.

The pump 22 may feed the fluid into the duct 21 in at least one of the expanded state, the contracted state, and the state of being deformed.

The pump 22 may be provided inside the duct 21.

The duct 21 may include a plurality of one-way valves provided therein. Each of the one-way valves enables a flow of the fluid in a single direction and restricts a flow of the fluid in other directions. The duct 21 may cause the fluid to flow by taking the fluid from the inlet 55 at a time of expanding and by feeding the taken fluid from the outlet 53 at a time of contracting.

The duct 21 is not necessarily coupled to the cover 43. The cover 43 does not necessarily form the channel 45.

The second coupling section 50 may fix the second duct 52 to the liquid ejecting head 19 without using the plate spring 66.

The second coupling section 50 may be provided in the second end 56 of the duct 21.

The first duct 51 may have constant thickness from one end to the other end.

The second duct 52 may have constant thickness from one end to the other end.

The second duct 52 may be constituted by a single member.

The first duct 51 may be constituted by plural members.

The first slide surface 58 and the second slide surface 59 may be in contact with each other.

The first duct 51 may be arranged outside the second duct 52.

The duct 21 may have a bellows shape. The duct 21 may be formed of a single member from the first end 54 to the second end 56.

A fluid flowing in the duct 21 is not limited to gas such as air and may be liquid such as water. When liquid is used, the inlet 55 and the outlet 53 may be coupled to the pump 22, and a portion of the duct 21 may be coupled to the liquid ejecting apparatus 11.

The liquid ejecting apparatus 11 may be a liquid ejecting apparatus that discharges or ejects liquid other than ink. The liquid to be ejected as droplets of a minute amount of liquid from the liquid ejecting apparatus may be in, for example, a granular state, a teardrop state, or a tailing thread-like state. Any material is applicable to the liquid here as long as the material is able to be ejected from the liquid ejecting apparatus. For example, any liquid is applicable as long as a substance thereof is in a liquid phase, and examples of the liquid include a liquid material having high or low viscosity and a fluid such as a sol, gel water, other inorganic solvents, an organic solvent, a solution, a liquid resin, liquid metal, or metal melt. The liquid includes not only a liquid as one state of a substance but also one in which particles of a functional material formed of a solid substance such as a pigment or metal particles are dissolved, dispersed, or mixed in a solvent. Representative examples of the liquid include ink as described in the aforementioned embodiments and liquid crystal. Here, the ink includes general water-based inks and oil-based inks, and various liquid compositions such as gel ink and hot melt ink. Specific examples of the liquid ejecting apparatus include an apparatus that ejects liquid containing, in a dispersed or dissolved manner, a material, such as an electrode material or a coloring material, which is used for, for example, manufacturing a liquid crystal display, an electroluminescent display, a surface emitting display, or a color filter. The liquid ejecting apparatus may be an apparatus that ejects a bioorganic substance used for manufacturing biochips, an apparatus that is used as a precision pipette and ejects liquid serving as a sample, a printing apparatus, or a micro-dispenser, for example. The liquid ejecting apparatus may be an apparatus that ejects lubricant onto a precision machine such as a watch or a camera with pinpoint accuracy or an apparatus that ejects, onto a substrate, a transparent liquid resin such as an ultraviolet curing resin to form, for example, a micro hemispherical lens or an optical lens used in an optical communication element or the like. The liquid ejecting apparatus may be an apparatus that ejects etchant for acid etching, alkaline etching, or the like to etch a substrate or the like.

Technical ideas and effects obtained from the above-described embodiments and modified examples will be described below.

A liquid ejecting apparatus includes: a liquid ejecting head that includes a nozzle surface on which a nozzle is open and that ejects a liquid through the nozzle; a housing that accommodates the liquid ejecting head; a moving mechanism that moves the liquid ejecting head relative to the housing in a moving direction intersecting the nozzle surface; and a duct in which a fluid flows, in which the duct includes a first coupling section coupled to the housing and a second coupling section coupled to the liquid ejecting head and is configured to expand and contract in the moving direction.

According to the configuration, the duct coupled to the housing and the liquid ejecting head is able to expand and contract in the moving direction. Accordingly, the duct expands/contracts in response to movement of the liquid ejecting head in the moving direction. It is therefore possible to cool the moving liquid ejecting head.

In the liquid ejecting apparatus, the duct may include a first duct including the first coupling section and a second duct including the second coupling section, the first duct may enable the fluid to flow between the housing and the second duct, and the second duct may enable the fluid to flow between the first duct and the liquid ejecting head and may slide relative to the first duct in accordance with movement of the liquid ejecting head relative to the housing.

According to the configuration, the duct expands/contracts when the second duct slides relative to the first duct. It is therefore possible to reduce possible deformation of the duct compared with an instance in which the duct has, for example, a bellows shape.

In the liquid ejecting apparatus, the first duct may include a first slide surface, the second duct may include a second slide surface facing the first slide surface, and the first slide surface and the second slide surface may be parallel to a virtual straight-line extending in the moving direction and be provided so as to encompass the virtual straight-line.

According to the configuration, the first slide surface and the second slide surface are parallel to the virtual straight-line extending in the moving direction and are provided so as to encompass the virtual straight-line. It is therefore possible to efficiently cause the fluid to flow compared with an instance in which, for example, the first slide surface and the second slide surface intersect the virtual straight-line.

In the liquid ejecting apparatus, the first slide surface and the second slide surface may be provided with a gap therebetween in an orthogonal direction orthogonal to the virtual straight-line, and the first duct and the second duct may be configured to move relative to each other in the orthogonal direction.

According to the configuration, the first duct and the second duct are able to move relative to each other in the orthogonal direction. Accordingly, the second duct is able to follow the liquid ejecting head even when the position of the liquid ejecting head with respect to the housing deviates in the orthogonal direction.

In the liquid ejecting apparatus, the first slide surface and the second slide surface may be provided with the gap therebetween, the gap having a sufficient dimension to enable the fluid to pass therethrough.

The second duct readily slides in a state in which the second slide surface is not in contact with the first slide surface compared with a state in which the second slide surface is in contact with the first slide surface. From this viewpoint, according to the configuration, the first slide surface and the second slide surface are provided with the gap therebetween, the gap having a sufficient dimension to enable the fluid to pass therethrough. The second duct is thus able to readily slide relative to the first duct.

The liquid ejecting apparatus may further include a flexible member, and the flexible member may be provided in the gap and slide relative to one of the first slide surface and the second slide surface.

According to the configuration, the flexible member provided in the gap is thus able to enable movement of the second duct following the liquid ejecting head even when the position of the liquid ejecting head with respect to the housing deviates in the orthogonal direction.

In the liquid ejecting apparatus, of the first slide surface and the second slide surface, one that is arranged in an inner portion may be constituted by a single member.

According to the configuration, of the first slide surface and the second slide surface, one that is arranged in an inner portion is constituted by a single member. Accordingly, even when the liquid ejecting apparatus is reduced in size, the slide surface arranged in an inner portion is readily bent and thus enables positional deviation of the liquid ejecting head with respect to the housing.

In the liquid ejecting apparatus, of the first slide surface and the second slide surface, one that is arranged in an outer portion may be constituted by plural members.

According to the configuration, of the first slide surface and the second slide surface, one that is arranged in an outer portion is constituted by plural members. It is therefore possible to easily increase the liquid ejecting apparatus in size.

In the liquid ejecting apparatus, the first duct may include a first thin tube section and a first thick tube section thicker than the first thin tube section, the second duct may include a second thin tube section and a second thick tube section thicker than the second thin tube section, the first thick tube section may be positioned between the first thin tube section and the liquid ejecting head and is thinner than the second thin tube section, the second thick tube section may be positioned between the second thin tube section and the liquid ejecting head, the first thick tube section and the second thin tube section may face each other in a state in which the duct is expanded, and the first thin tube section and the second thin tube section may face each other in a state in which the duct is contracted.

According to the configuration, in the state in which the duct is expanded, since the first thick tube section and the second thin tube section face each other, it is possible to narrow the gap between the first duct and the second duct, enabling a reduction in fluid leakage. In the state in which the duct is contracted, since the second thin tube section faces the first thin tube section which is thinner than the first thick tube section, the gap between the first duct and the second duct is widened, thus making it possible to easily slide the second duct relative to the first duct.

In the liquid ejecting apparatus, the second coupling section may have elasticity.

According to the configuration, the second coupling section has elasticity and thus enables positional deviation of the liquid ejecting head.

In the liquid ejecting apparatus, the duct may include a first end in which an outlet is open and a second end in which an inlet is open, and the second coupling section may be provided between the first end and the second end.

According to the configuration, the second coupling section is provided between the first end and the second end of the duct. It is therefore possible to provide the second coupling section close to the first end compared with an instance in which, for example, the second coupling section is provided in the second end.

In the liquid ejecting apparatus, the second coupling section may include a plate spring having elasticity, a handle provided in a tip end of the plate spring, and a protrusion placed over the liquid ejecting head, and the plate spring may push the protrusion against the liquid ejecting head.

According to the configuration, the second coupling section has the handle provided in the tip end of the plate spring, and the plate spring pushes the protrusion against the liquid ejecting head. An operator is thus able to detach the protrusion from the liquid ejecting head by operating the handle to deform the plate spring.

In the liquid ejecting apparatus, the liquid ejecting head may include a drive element driven such that the liquid is ejected from the nozzle, a signal generating circuit that generates a driving waveform signal to be applied to the drive element, and a cover that covers the signal generating circuit, and not only the duct but also the cover may enable the fluid to flow therein.

According to the configuration, the liquid ejecting head has the cover that covers the signal generating circuit. The duct and the cover enables the fluid to flow therein. It is therefore possible to efficiently cool the signal generating circuit by using the fluid flowing in the cover.

The liquid ejecting apparatus may further include a pump that feeds the fluid into the duct, and the pump feeds the fluid into the duct which may be in an expanded state, a contracted state, or in a state of being deformed.

According to the configuration, the pump feeds the fluid into the duct which may be in the expanded state, in the contracted state, or in a state of being deformed. That is, the pump is able to feed the fluid into the duct regardless of the duct state. It is therefore possible to cool the stopped liquid ejecting head or the moving liquid ejecting head.

What is claimed is:

1. A liquid ejecting apparatus, comprising:

a liquid ejecting head that includes:

a nozzle surface on which a nozzle is open;

a drive element driven such that a liquid is ejected from the nozzle, wherein the nozzle surface ejects the liquid through the nozzle;

a signal generating circuit that generates a driving waveform signal to be applied to the drive element; and a cover that covers the signal generating circuit, wherein the cover includes a channel and a first opening;

a housing that accommodates the liquid ejecting head;

a duct in which a fluid flows, wherein the duct includes:

a first duct including a first coupling section configured to attach the first duct to the housing, a first thin tube section, and a first thick tube section, and a second duct including a second coupling section configured to attach the second duct to the liquid ejecting head, a second thin tube section, and a second thick tube section, wherein the duct is coupled to the channel, and the duct and the cover enable the fluid to flow therein; and a moving mechanism that moves the liquid ejecting head relative to the housing in a moving direction intersecting the nozzle surface, wherein the second duct slides relative to the first duct in accordance with the movement of the liquid ejecting head by the moving mechanism, wherein the signal generating circuit is between the duct and the first opening in a depth direction orthogonal to the moving direction.

2. The liquid ejecting apparatus according to claim 1, wherein the first duct enables the fluid to flow between the housing and the second duct, and the second duct enables the fluid to flow between the first duct and the liquid ejecting head.

3. The liquid ejecting apparatus according to claim 2, wherein the first duct includes a first slide surface, the second duct includes a second slide surface facing the first slide surface, and the first slide surface and the second slide surface are parallel to a virtual straight-line extending in the moving direction and are provided so as to encompass the virtual straight-line.

4. The liquid ejecting apparatus according to claim 3, wherein the first slide surface and the second slide surface are provided with a gap therebetween in an orthogonal direction orthogonal to the virtual straight-line, and the first duct and the second duct are configured to move relative to each other in the orthogonal direction.

5. The liquid ejecting apparatus according to claim 4, wherein the first slide surface and the second slide surface are provided with the gap therebetween, the gap having a sufficient dimension to enable the fluid to pass therethrough.

6. The liquid ejecting apparatus according to claim 4, further comprising:

a flexible member, wherein the flexible member is provided in the gap and slides relative to one of the first slide surface and the second slide surface.

7. The liquid ejecting apparatus according to claim 3, wherein one of the first slide surface and the second slide surface is arranged in an inner portion and is constituted by a single member.

8. The liquid ejecting apparatus according to claim 3, wherein, one of the first slide surface and the second slide surface is arranged in an outer portion and is constituted by plural members.

9. The liquid ejecting apparatus according to claim 2, wherein the first thick tube section is thicker than the first thin tube section, the second thick tube section is thicker than the second thin tube section, the first thick tube section is positioned between the first thin tube section and the liquid ejecting head, the second thick tube section is positioned between the second thin tube section and the liquid ejecting head, the first thick tube section faces the second thin tube section in a state in which the duct is expanded, and the first thin tube section faces the second thin tube section in a state in which the duct is contracted.

10. The liquid ejecting apparatus according to claim 1, wherein the second coupling section has elasticity.

11. The liquid ejecting apparatus according to claim 1, wherein the duct includes a first end in which an outlet is open and a second end in which an inlet is open, and the second coupling section is provided between the first end and the second end.

12. The liquid ejecting apparatus according to claim 1, wherein the second coupling section includes a plate spring having elasticity, a handle provided in a tip end of the plate spring, and a protrusion placed over the liquid ejecting head, and the plate spring pushes the protrusion against the liquid ejecting head.

13. The liquid ejecting apparatus according to claim 1, further comprising a pump that feeds the fluid into the duct, wherein the pump feeds the fluid into the duct which is in one of an expanded state, a contracted state, or a state of being deformed.

14. The liquid ejecting apparatus according to claim 1, wherein when the liquid ejecting head is at a printing position, an amount by which the first duct and the second duct overlap is minimum.

* * * * *